United States Patent [19]
Brinkmann et al.

[11] 3,974,234
[45] Aug. 10, 1976

[54] THERMOPLASTIC MOLDING COMPOSITIONS

[75] Inventors: Ludwig Brinkmann, Frankfurt am Main; Harald Cherdron, Naurod, Taunus, both of Germany

[73] Assignee: Hoechst Aktiengesellschaft, Frankfurt am Main, Germany

[22] Filed: Jan. 27, 1975

[21] Appl. No.: 544,345

[30] Foreign Application Priority Data
Jan. 28, 1974 Germany............................ 2403889

[52] U.S. Cl..................... 260/857 G; 260/857 UN; 260/857 L; 260/857 D
[51] Int. Cl.$^2$......................................... C08L 77/10
[58] Field of Search..... 260/857 UN, 857 D, 857 G, 260/857 L

[56] References Cited
UNITED STATES PATENTS
3,134,746   5/1964   Grabowski...................... 260/857 G
3,274,289   9/1966   Murdock et al. ............ 260/857 UN
3,337,648   8/1967   Aelion et al. ................... 260/857 D
3,546,319   12/1970  Prevorsek et al. .............. 260/857 D
3,597,498   8/1971   Christensen................... 260/857 UN
3,796,771   3/1974   Owens et al. ................ 260/857 UN FOREIGN PATENTS OR APPLICATIONS
7,102,354   1/1967   Japan............................. 260/857 D

*Primary Examiner*—Murray Tillman
*Assistant Examiner*—Thurman K. Page
*Attorney, Agent, or Firm*—Curtis, Morris & Safford

[57] ABSTRACT

The invention relates to molding compositions comprising at least one amorphous polyamide and at least one styrene homo- or copolymer with a derivative of acrylic acid, said styrene polymer being modified with an elastomer and showing impact strength. The blends according to the invention show high hardness and flexural modulus and, at the same time, excellent fluidity.

9 Claims, No Drawings

THERMOPLASTIC MOLDING COMPOSITIONS

Various amorphous polyamides showing high degrees of hardness and stiffness have been described in the recent past. Such thermoplastic are especially recommended for technical use. They present the inconvenience, however, that good mechanical properties can be obtained only with very high molecular weight products that are highly viscous in the melt, the precision injection-molding work-up of which may sometimes prove to be very difficult. The fact that the monomers are very expensive also reduces the possibilities of their application.

Thermoplastic molding compositions of amorphous polyamides and styrene-polymer have now been found which comprise a. from 0.1 to 50 weight percent, preferably from 1 to 40 weight percent, of at least one polystyrene or copolymer of styrene with a derivative of acrylic acid, preferably with acrylonitrile, said polystyrene or copolymer of styrene being modified with an elastomer and showing impact strength, and b. from 99.9 to 50 weight %, preferably from 99 to 60 weight %, of at least one amorphous polyamide derived from $\alpha_1$) 5 to 50 mole %, preferably 10 to 35 mole %, of 1,3-bis-(aminomethyl)-cyclohexane and/or 2,5-bis-(aminomethyl)-bicyclo[2,2,1]-heptane and/or 2,6-bis-(aminomethyl)-bicyclo[2,2,1-]heptane and/or at least one bis-(4-aminocyclohexyl)-derivative of an alkane having from 1 to 6 carbon atoms, preferably from 1 to 3 carbon atoms, and/or m-xylylene-diamine, up to 50 mole %, preferably up to 30 mole %, of m-xylylene-diamine being optionally replaced by p-xylylene-diamine, $\alpha_2$. 0 to 45 mole %, preferably 0 to 35 mole %, of at least one straight-chain or branched aliphatic dianine having from 4 to 20 carbon atoms, preferably from 6 to 12 carbon atoms, the amino groups being separated by at least 4 carbon atoms, preferably by at least 6 carbon atoms, $\beta_1$. 5 to 50 mole %, preferably 10 to 35 mole %, of at least one aromatic dicarboxylic acid having from 7 to 20 carbon atoms, preferably from 8 to 14 carbon atoms, especially having one nucleus and carrying carboxyl groups in meta or para position, $\beta_2$. 0 to 45 mole %, preferably 0 to 35 mole %, of at least one saturated, straight-chain or branched aliphatic dicarboxylic acid having from 6 to 20 carbon atoms, preferably from 6 to 12 carbon atoms, the carboxyl groups being separated by at least 4 carbon atoms, and $\gamma$. 0 to 80 mole %, preferably 0 to 50 mole %, of at least one aliphatic amino carboxylic acid having from 2 to 20 carbon atoms, preferably from 6 to 12 carbon atoms, especially $\omega$-amino carboxylic acid or its lactam, the mole % sum of the components ($\alpha_1$) and ($\alpha_2$) equaling the mole % sum of the components ($\beta_1$) and ($\beta_2$), the mole % sum of all components ($\alpha_1$), ($\alpha_2$), ($\beta_1$), ($\beta_2$) and ($\gamma$) being 100 mole %, the mole % sum of the components ($\alpha_1$) and ($\beta_1$) being from 20 to 95 mole %, preferably from 50 to 90 mole %, the mole % sum of the components ($\alpha_2$), ($\beta_2$) and ($\gamma$) being from 5 to 80 mole %, preferably from 10 to 50 mole %, and all the specifications given in mole % being calculated on the sum of all components ($\alpha_1$), ($\alpha_2$), ($\beta_1$), ($\beta_2$) and ($\gamma$).

The copolymers and/or the polymer mixtures to be used according to the invention as per ($a$) are polystyrenes modified to show impact strength which can be prepared according to known processes.

According to the invention they contain:

$\alpha$. from 60 to 95 weight %, preferably from 75 to 90 weight %, of styrene and/or of a styrene derivative, the styrene or the styrene derivative being substituted optionally up to a proportion of 35 weight %, preferably from 10 to 21.5 weight %, by an acrylic acid derivative, preferably by acrylonitrile, $\beta$. from 40 to 5 weight %, preferably from 25 to 10 weight %, of an elastomer having a second order transition temperature below 0°C, preferably below −20°C.

Styrene as monomer component of ($a$) ($\alpha$) may be replaced also by styrene derivatives such as styrenes methylated in the nucleus (e.g. o- or p-vinyl- toluene or vinyl-xylenes) or styrenes halogenated in the nucleus (e.g. o- or p-chlorostyrene or bromostyrene) or vinylcyclohexane, or methyl- or halogen-substituted derivatives of vinylcyclohexane, or mixtures of two or several derivatives of styrene, preferably mixtures of from 95 to 60 weight % of styrene and from 5 to 40 weight % of $\alpha$-methyl styrene.

Suitable derivatives of acrylic acid to be optionally used as monomer components of ($a$) ($\alpha$) are esters of acrylic acid, of methacrylic acid, of itaconic acid (= carboxymethylacrylic acid), of maleic acid (carboxyacrylic acid) or fumaric acid with lower aliphatic alcohols (e.g. methanol, ethanol, isopropanol, butanol, isobutanol, hexanol, octanol, isooctanol or 2-ethyl-hexanol) either separately or combined with one another and/or with acrylonitrile.

As elastomers according to ($a$) ($\beta$) may be used diene rubbers or mixtures of diene rubbers, for example, rubber-like polymers of one or several 1,3-dienes such as butadiene, isoprene, piperylene or 2-chloro-1,3-butadiene. It is also possible to use copolymers of 1,3-dienes comprising up to equal weight proportions of one or several copolymerizable monomers having one double bond such as styrene, acrylonitrile, acrylic acid ester and others.

Suitable elastomers according to ($a$) ($\beta$) are also ethylenepropylene-tercomponent-rubbers (EPTR) which are obtained by polymerization of from 70 to 30 weight % of ethylene, from 30 to 70 weight % of propylene and from 0.5 to 15 weight % of a diolefinic tercomponent. Suitable tercomponents are diolefines having at least 5 carbon atoms, the double bonds of which are not conjugated, such as 5-ethylidene norbornene, dicyclopentadiene, bicyclo[2,2,1]heptadiene and 1,4-hexadiene.

Further suitable elastomers according to ($a$) ($\beta$) are also polyacrylic acid esters of alcohols having from 4 to 8 carbon atoms, preferably of n-butanol.

Besides the copolymers to be used preferably according to ($a$) which are obtained by at least partially grafting monomers according to ($\alpha$) onto the elastomers according to ($\beta$), also mechanical mixtures of polymers of the monomers according to ($\alpha$) with elastomers according to ($\beta$) or random copolymers or block copolymers of monomers according to ($\alpha$) with 1,3-dienes such as butadiene, isoprene, piperylene or 2-chloro-1,3-butadiene may be used.

The diamines 1,3-bis-(aminomethyl)-cyclohexane and 1,4-bis-(aminomethyl)-cyclohexane to be used for preparing the polyamide portion (b) of the molding compositions according to the invention can be obtained by hydrogenation of the corresponding xylylene diamines. Especially suitable for the preparation of the amorphous polyamides (b) are trans-1,3-bis-(aminoethyl)-cyclohexane and mixtures of trans-1,3-bis-(aminomethyl)-cyclohexane and trans-1,4-bis-(aminomethyl)-cyclohexane. But it is also possible to use the corresponding cis-diamines or mixtures of cis- and trans-diamines.

The diamines 2,5-bis-(aminomethyl)-bicyclo[2,2,1]-heptane and 2,6-bis-(aminomethyl)-bicyclo[2,2,1]-heptane to be used for the polyamide portion (b) of the molding compositions according to the invention can be prepared by a simple method and based on cheap starting materials such as described in U.S. Pat. Nos. 2,666,748, 2,666,780 and 3,143,570. Preference is given to the use of mixtures of these diamines, the various stereoisomeric diamines being suitable.

The bis-(4-aminocyclohexyl)-alkanes to be used for preparing the polyamide portion (b) of polyamide molding compositions according to the invention are made of cheap starting materials, i.e. phenol and aldehydes or ketones as per known processes. There may be used bis-(4-aminocyclohexyl)-derivatives of alkanes having from 1 to 6 carbon atoms, preferably from 1 to 3 carbon atoms, especially bis-(4-aminocyclohexyl)-methane and 2,2-bis-(4-aminocyclohexyl)-propane.

The diamines m-xylylene diamine and p-xylylene diamine to be used for preparing the polyamide portion (b) of the molding compositions according to the invention can be obtained by hydrogenation of isophthalic acid dinitrile or therephtalic acid dinitrile.

Suitable straight-chain or branched aliphatic diamines ($\alpha_2$) for the preparation of the polyamide portion (b) of the molding compositions according to the invention are those having from 4 to 20 carbon atoms, preferably from 6 to 12 carbon atoms, especially hexamethylene diamine.

Further advantageous examples of aliphatic diamines ($\alpha_2$) that are suitable for the preparation of the polyamide portion (b) of the molding compositions according to the invention are tetramethylene diamine, pentamethylene diamine, 2-methylpentamethylene diamine, 2-methylhexamethylene diamine, 3-methylhexamethylene diamine, 3,4-dimethylhexamethylene diamine, 2,2,4-trimethylhexamethylene diamine, 2,4,4-trimethylhexamethylene diamine, heptamethylene diamine, 2-methyl-4-ethylheptamethylene diamine, octamethylene diamine, nonamethylene diamine, decamethylene diamine, undecamethylene diamine and dodecamethylene diamine.

It is also possible to use mixtures of two or several of the aliphatic diamines.

Suitable aromatic dicarboxylic acids ($\beta_1$) for the preparation of the polyamide portion (b) of the molding compositions according to the invention are those having from 7 to 20 carbon atoms, preferably from 8 to 14 carbon atoms, or mixtures of these dicarboxylic acids. Especially suitable are dicarboxylic acids having one nucleus and carrying carboxyl groups in meta or para position, especially isophthalic acid and terephthalic acid.

Further advantageous examples of aromatic dicarboxylic acids ($\beta_1$) for the preparation of the polyamide portion (b) of the molding compositions according to the invention are 2,6-pyridine-dicarboxylic acid, 1,4-naphthalene-dicarboxylic acid, 1,5-naphthalene-dicarboxylic acid, 2,6-naphthalene-dicarboxylic acid and 4,4'-diphenylsulfone-dicarboxylic acid.

There may also be used mixtures of two or several of the aromatic dicarboxylic acids, especially mixtures of isophthalic acid with terephthalic acid.

As straight chain or branched aliphatic dicarboxylic acids ($\beta_2$) suitable for the preparation of the polyamide portion (b) of the molding compositions according to the invention are to be considered those having from 6 to 20 carbon atoms, preferably from 6 to 12 carbon atoms, especially adipic acid and decanedicarboxylic acid-1,10.

Further advantageous examples of aliphatic dicarboxylic acids ($\beta_2$) being suitable for the preparation of the polyamide portion (b) of the molding compositions according to the invention are 2,2,4-trimethyl-adipic acid, 2,4,4-trimethyladipic acid, pimelic acid, suberic acid, azelaic acid and sebacic acid.

It is also possible to use mixtures of two or several of the aliphatic dicarboxylic acids.

For preparing the polyamide portion (b) of the molding compositions according to the invention suitable aliphatic aminocarboxylic acids ($\gamma$) are those having from 2 to 20 carbon atoms, preferably from 6 to 12 carbon atoms, especially $\omega$-aminocarboxylic acids. It is especially advantgeous to use $\epsilon$-aminocaproic acid or $\omega$-aminolauric acid.

Further advantageous examples of aliphatic aminocarboxylic acids ($\gamma$) for the preparation of the polyamide portion (b) of the molding compositions according to the invention are: aminopivalic acid, $\omega$-aminoheptylic acid, $\omega$-aminocaprylic acid, $\omega$-aminopelargonic acid or $\omega$-aminoundecanoic acid.

It is also possible to use mixtures of two or several of the aliphatic aminocarboxylic acids.

The aminocarboxylic acids may be replaced by their lactams.

The polyamide(s) (b) of the molding compositions according to the invention is/are prepared as per known processes. Diamine(s), dicarboxylic acid(s) and -possibly- aminocarboxylic acid(s) or its/their lactam(s), optionally with water added, are introduced into an autoclave made of stainless steel. It is often convenient to prepare first a salt based on the starting components, this salt being then introduced into the steel autoclave, optionally adding water. The contents of the autoclave are heated to approximately from 200° to 260°C while stirring. Steam is then discharged and the temperature increased to from 265° to 300°C. At this temperature the condensation is continued in a nitrogen current, optionally in vacuo, until the polyamide will have attained the desired molecular weight.

It is often convenient to use an excess quantity of up to 5 weight %, preferably from 0.5 to 2 weight %, of diamines ($\alpha_1$) and ($\alpha_2$) as compared to the dicarboxylic acids in order to compensate the loss of diamines by distillation upon polycondensation.

Polyamides with especially high molecular weights and good mechanical properties are obtained by submitting the polyamides prepared in the autoclave, which is provided with an agitator, to condensation in a further processing step, preferably in a double screw extruder in vacuo.

In the preparation of the polyamides the dicarboxylic acid(s) may also be replaced by its/their derivatives such as dicarboxylic acid halides, esters, nitriles or amides, according to known processes.

The polyamide(s) (b) of the molding compositions according to the invention should have a reduced specific viscosity (RSV)-determined on a solution of 1 g of polyamide in 100 ml of phenol/tetrachloroethane (weight proportion 60 : 40) at 25°C — being from 0.6 dl/g to 3 dl/g, preferably from 1 to 2 dl/g.

When preparing the polyamide(s) (b) of the molding compositions according to the invention, minor quantities (of up to 5 mole %, preferably of up to 1 mole %) of monocarboxylic acids, e.g. acetic acid, or monoamines may be incorporated by condensation for controlling the molecular weight. It is furthermore possible to incorporate by condensation also minor quantities of trifunctional or multifunctional amines or/and carboxylic acids to act as branching agents.

For preparing the molding compositions according to the invention the amorphous polyamide(s) (b) is/are blended with the styrene-containing polymer(s) (a) and/or with the polystyrene-containing polymer mixture(s) (a) being present e.g. in granular form and injection-molded directly to shaped articles by means of an injection molding machine. In order to achieve a particularly good homogenizing effect, it is also possible to melt both components together in an extruder, to chill the removed strand in a water bath, to granulate and to feed the homogeneous granules into the work-up machine after the drying step. If the polyamides prepared in a condensing vessel are submitted to additional condensing in vacuo in a double screw extruder so as to attain particularly high molecular weights, the styrene-containing copolymers and/or the polystyrene-containing polymer mixtures can be blended with the amorphous polyamides while the additional condensing process is still going on.

The blends according to the invention have good mechanical properties. They are characterized by high hardness and flexural modulus and at the same time by excellent fluidity. A very important factor is the excellent fluidity of the blends so that it is possible to easily and completely fill even injection molds having long and narrow flow channels.

The molding compositions according to the invention can be used wherever good mechanical properties are required. Besides the especially advantageous injection molding to yield technical parts, the molding compositions may also be worked up to sheets, plates and tubes. Optionally, the molding compositions may also contain further additives blended-in, e.g. antistatic agents, flame-retardants, stabilizing agents against the actions of heat and light, lubricants, plastifiers, pigments, dyestuffs, optical brighteners, mold release agents and fillers such as asbestos fiber, glass fiber, carbon black, graphite, finely pulverized metals or metal oxides, ground glass and molbydenum sulfide.

The following examples illustrate the invention:

The viscosity values of the polyamides have been determined at 25°C on solutions of 1 g of polyamide in 100 ml of phenol-tetrachloroethane (parts by weight 60 : 40).

The ball indentation hardness was determined according to DIN (=German Industrial Standard) No. 53 456 the load being 50 kg, the diameter of the ball = 5 mm and the measuring time = 10 seconds; the modulus of elasticity was obtained by means of the flexural test according to DIN 53 452 with a small standard test bar.

STARTING PRODUCTS

Styrene copolymer $A_1$

This copolymer is prepared according to the usual and well-known mass/suspension process by polymerization of a solution of ethylene-propylene-terpolymer-rubber (EPTR : 54 weight % of ethylene, 40 weight % of propylene and 6 weight % of ethylidene norbornene) in styrene. The EPTR was dissolved in styrene, preliminary polymerization was performed in the mass while stirring and polymerization was completed in aqueous suspension. The graft copolymer consisted of 10 weight % of EPTR and of 90 weight % of styrene.

Styrene copolymer $A_2$

This copolymer was prepared according to the usual and well-known mass/suspension process by polymerizing a solution of polybutadiene-rubber (proportion of the structural units: about 40 % cis-, 50 % trans- and 10 % vinyl) in styrene. The rubber was dissolved in styrene, preliminary polymerization was performed in the mass while stirring and polymerization completed in aqueous suspension. The graft copolymer contained 6 % of polybutadiene-rubber and 94 % of styrene.

Styrene copolymer $A_3$

This copolymer was prepared according to the usual and well-known mass/suspension process by polymerization of a solution of 12 parts by weight of EPTR (54 parts by weight of ethylene, 40 parts by weight of propylene and 6 parts by weight of ethylidene norbornene) in a mixture of 67 parts by weight of styrene and 12 parts by weight of acrylonitrile. Preliminary polymerization was performed in the mass while stirring and polymerization was completed in aqueous suspension.

Styrene copolymer $A_4$

A copolymer was prepared according to the process described in German Offenlegungsschrift No. 1.495.089 from 13 parts by weight of polybutadiene-rubber (proportion of the structural units: about 40 % cis-, 50 % trans- and 10 % vinyl), 64 parts by weight of styrene and 23 parts by weight of acrylonitrile.

Styrene copolymer $A_5$

A thermoplastic molding composition was prepared according to the process described by German Pat. No. 1.138.921, based on 30 parts by weight of acrylic acid butyl ester, 53 parts by weight of styrene and 17 parts by weight of acrylonitrile.

Polyamide $B_1$

This polyamide was prepared according to the usual and well-known polycondensing process from 2.032 kg of 1,3-bis-(aminomethyl)-cyclohexane (essentially present as the trans-isomer). 0.871 kg of 1,4-bis-(aminomethyl)-cyclohexane (essentially present as the trans-isomer), 3.323 kg of terephthalic acid and 2.246 kg of the salt from hexamethylene diamine and adipic acid (AH — salt). RSV (Reduced Specific Viscosity) = 1.30 dl/g.

Polyamide $B_2$

This polyamide was prepared according to the usual and well-known polycondensing process from 2.873 kg of 1,3-bis-(aminomethyl)-cyclohexane (essentially present as the trans-isomer), 3.322 kg of terephthalic acid and 1.825 kg of ε-caprolactam.
RSV = 1.35 dl/g.

Polyamide B₃

This polyamide was prepared according to the usual and well-known polycondensing process from 2.687 kg of bis-(aminomethyl)-norbornane mixture, 2.837 kg of terephthalic acid and 2.974 kg of AH salt.
RSV = 1.33 dl/g.

The bis-(aminomethyl)-norbornane mixture was prepared from 2-cyano-bicyclo[2,2,1]heptane-5 according to known processes by hydroformylation and subsequent reductive amination (reaction with ammonia and hydrogen) of the formyl compound.

Polyamide B₄

The polyamide was prepared according to the usual and well-known polycondensing process from 2.656 kg of terephthalic acid, 0.666 kg of isophthalic acid, 2.779 kg of m-xylylene diamine and 1.308 kg of ε-caprolactam.
RSV = 1.13 dl/g.

For preparing the molding compositions according to the invention the dry and ground polyamides were blended with the styrene copolymers. The mixtures were submitted to homogenizing in an extruder at a cylinder temperature of 250°C. The granulated and dried blends were then injection-molded in an injection molding extruder to yield test bars for the impact tensile test according to DIN 53 448 and small standard test bars for the flexural test according to DIN 53 452. The cylinder temperature in the three heating areas involved were 280°C / 270°C / 270°C. The injection nozzle had a temperature of 280°C and the temperature of the mold was 50°C. The injection pressure was 120 atmospheres and the final pressure was 100 atmospheres.

The examples 1 – 12 prove that the molding compositions according to the invention fill up the mold better, due to their good fluidity, than any one of the non-modified basic polyamides (comparative examples 12 to 15).

I. from 0.1 to 50 weight % of an elastomer having grafted thereon at least one polystyrene or copolymer of styrene with a derivative of acrylic acid, said elastomer being selected from rubber-like polymers and copolymers of dienes, ethylene/ propylene/tercomponent rubbers, polyacrylic esters of alcohols having 4 to 8 carbon atoms and mixtures of said rubbers, and II. from 99.9 to 50 weight % of at least one amorphous polyamide derived from a₁. 5 to 50 mole % of cyclic diamine selected from 1,3-bis-(aminomethyl)-cyclohexane; 1,4-bis-(aminomethyl)-cyclohexane; 2,5-bis-(aminomethyl)-bicyclo[2,2,1]heptane; 2,6-bis-(aminomethyl)-bicyclo[2,2,1]heptane; bis-(4-aminocyclohexyl)-derivative of an alkane having from 1 to 6 carbon atoms; m-xylylene diamine with up to 50 mole % of the m-xylylene diamine being replaced by p-xylylene diamine, and mixtures of such diamines, a₂. 0 to 45 mole % of at least one straight-chain or branched aliphatic diamine having from 4 to 20 carbon atoms, the amino groups being separated by at least 4 carbon atoms, b₁. 5 to 50 mole % of at least one aromatic dicarboxylic acid having from 7 to 20 carbon atoms, b₂. 0 to 45 mole % of at least one saturated, straight-chain or branched aliphatic dicarboxylic acid having from 6 to 20 carbon atoms, the carboxyl groups being separated from each other by at least 4 carbon atoms, and c. 0 to 80 mole % of at least one aliphatic amino carboxylic acid having from 2 to 20 carbon atoms or its lactam, the mole % sum of the components ($a_1$) and ($a_2$) equaling the mole % sum of the components ($b_1$) and ($b_2$), the mole % sum of all components ($a_1$), ($a_2$) ($b_1$), ($b_2$) and ($c$) being 100 mole %, the mole % sum of the components ($a_1$) and ($b_1$) being from 20 to 95 mole %, the mole % sum of the components ($a_2$), ($b_2$) and ($c$) being from 5 to 80 mole %, and all the values given in mole % being calculated on the sum of all components ($a_1$), ($a_2$), ($b_1$), ($b_2$) and ($c$).

TABLE 1

Examples 1 to 15

| Examples | Composition of the blend | | | | mold filling (test bar for impact tensile test) accordg. to DIN 53 448 | Properties of the injected blends | |
|---|---|---|---|---|---|---|---|
| | styrene copolymer | (weight %) | polyamide | (weight %) | | hardness (kg/cm²) | flexural modulus (kg/cm²) |
| 1 | A₁ | 5 | B₁ | 95 | good | 1675 | 29 300 |
| 2 | A₂ | 5 | B₁ | 95 | good | 1695 | 29 500 |
| 3 | A₃ | 2,5 | B₄ | 97.5 | good | 2120 | 37 200 |
| 4 | A₃ | 5 | B₁ | 95 | good | 1665 | 29 100 |
| 5 | A₃ | 30 | B₂ | 70 | good | 1430 | 28 500 |
| 6 | A₄ | 1 | B₂ | 99 | good | 1810 | 35 900 |
| 7 | A₄ | 5 | B₁ | 95 | good | 1695 | 28 700 |
| 8 | A₄ | 10 | B₃ | 90 | good | 1675 | 28 100 |
| 9 | A₄ | 25 | B₃ | 75 | good | 1500 | 26 800 |
| 10 | A₅ | 5 | B₁ | 95 | good | 1675 | 29 100 |
| 11 | A₅ | 10 | B₃ | 90 | good | 1625 | 28 300 |
| 12 | A₅ | 40 | B₂ | 60 | good | 1305 | 24 900 |
| 13⁺ | — | | B₁ | 100 | 90% of mold filled | 1860 | 31 500 |
| 14⁺ | — | | B₂ | 100 | 90% of mold filled | 1850 | 33 100 |
| 15⁺ | — | | B₄ | 100 | 90% of mold filled | 2140 | 38 000 |

⁺Comparative examples

What is claimed is:

1. A thermoplastic molding composition consisting essentially of (I) styrene polymer and (II) amorphous polyamide comprising:

2. Molding composition according to claim 1, wherein the elastomer is an ethylene-propylene-terpolymer-rubber.

3. Molding composition according to claim 1, wherein the elastomer is a polybutadiene-rubber.

4. Molding composition according to claim 1, wherein the elastomer is a polyacrylic acid ester.

5. Molding composition according to claim 1, wherein the aliphatic diamine ($a_2$) is hexamethylene diamine.

6. Molding composition according to claim 1, wherein the aromatic dicarboxylic acid ($b_1$) is therephthalic acid or/and isophthalic acid.

7. Molding composition according to claim 1, wherein the aliphatic dicarboxylic acid ($b_2$) is adipic acid or/and decane-dicarboxylic acid-1,10.

8. Molding composition according to claim 1, wherein the aliphatic aminocarboxylic acid ($c$) is ε-aminocarpoic acid or/and ω-aminolauric acid.

9. A thermoplastic molding composition consisting essentially of (I) styrene polymer and (II) amorphous polyamide comprising:
  I. 1 to 40 weight % of an elastomer having grafted thereon at least one polystyrene or copolymer of styrene with acrylonitrile, said elastomer being selected from rubber-like polymers and copolymers of dienes, ethylene/propylene/tercomponent rubbers, polyacrylic esters of alcohols having 4 to 8 carbon atoms and mixtures of said rubbers and
  II. from 99 to 60 weight % of at least one amorphous polyamide derived from
    $a_1$. 10 to 35 mole % of cyclic diamine selected from 1,3-bis-(aminomethyl)-cyclohexane; 1,4-bis-(aminomethyl)-cyclohexane; 1,4-bis-(aminomethyl)-cyclohexane; 2,5-bis-(aminomethyl)-bicyclo[2,2,1]heptane; 2,6-bis-(aminomethyl)-bicyclo[2,2,1]-heptane; bis-(4-aminocyclohexyl)-derivative of an alkane having from 1 to 3 carbon atoms, m-xylylene diamine with up to 30 mole % of the m-xylylene diamine being replaced by p-xylylene diamine and mixtures of such diamines,
    $a_2$. 0 to 35 mole % of at least one straight-chain or branched aliphatic diamine having from 6 to 12 carbon atoms, the amino groups being separated by at least 6 carbon atoms,
    $b_1$. 10 to 35 mole % of at least one aromatic mononuclear dicarboxylic acid having from 8 to 14 carbon atoms and carrying carboxyl groups in meta or para position,
    $b_2$. 0 to 35 mole % of at least one saturated, straight-chain or branched aliphatic dicarboxylic acid having from 6 to 12 carbon atoms, the carboxyl groups being separated from each other by at least 4 carbon atoms, and
    c. 0 to 50 mole % of at least one aliphatic amino carboxylic acid having from 6 to 12 carbon atoms or its lactams, the mole % sum of the components ($a_1$) and ($a_2$) equaling the mole % sum of the components ($b_1$) and ($b_2$), the mole % sum of all components ($a_1$), ($a_2$), ($b_1$), ($b_2$) and ($c$) being 100 mole %, the mole % sum of the components ($a_1$) and ($b_1$) being from 50 to 90 mole %, the mole % sum of the components ($a_2$), ($b_2$) and ($c$) being from 10 to 50 mole % and all values given in mole % being calculated on the sum of all components ($a_1$), ($a_2$), ($b_1$), ($b_2$) and ($c$).

* * * * *